219-121

2/28/84 OR 4,434,349

SR

United States Patent [19]

Tsutsumi

[11] 4,434,349

[45] Feb. 28, 1984

[54] LASER BEAM CUTTING MACHINES AND THE LIKE

[75] Inventor: Akira Tsutsumi, La Mirada, Calif.

[73] Assignee: Amada Engineering & Service Co., La Mirada, Calif.

[21] Appl. No.: 345,680

[22] Filed: Feb. 4, 1982

[30] Foreign Application Priority Data

Feb. 6, 1981 [JP] Japan ............................ 56-14924[U]
Apr. 30, 1981 [JP] Japan ................................. 56-64351

[51] Int. Cl.[3] ............................................ B23K 27/00

[52] U.S. Cl. ........................ 219/121 LG; 219/121 FS; 219/121 PC

[58] Field of Search ................ 219/121 LG, 121 LN, 219/121 FS, 121 EZ, 121 EH, 121 PC, 121 PH, 121 PU, 137.41; 228/57

[56] References Cited

U.S. PATENT DOCUMENTS 3,612,814 10/1971 Houldcroft .
4,063,059 12/1977 Brolund et al. .......... 219/121 PC X
4,338,507 7/1982 Scott ............................ 219/121 PC
4,388,514 6/1983 Coughlin et al. .......... 219/137.41 X

*Primary Examiner*—C. L. Albritton
*Attorney, Agent, or Firm*—Wigman & Cohen

[57] ABSTRACT

The present invention relates generally to a laser beam machine for cutting sheet metal workpieces and more particularly to a dust collecting apparatus therefor. The apparatus comprises a first filter chamber in which a bucket and an air filter are provided beneath a working area, a second filter chamber in which a liquid filter is communicated with a vacuum pump, and a device for introducing fumes into the liquid filter from the first filter chamber through the air filter. An aspirator is positioned between the working area and the first filter chamber for the purpose of sucking the fumes into the first filter chamber. The aspirator may include a venturi tube. The first filter chamber provides an ancillary bed on the bottom thereof for molten metal slag. The second filter chamber provides a bubble breaker and a moisture separator.

6 Claims, 6 Drawing Figures

LASER BEAM CUTTING MACHINES AND THE LIKE

BACKGROUND OF THE INVENTION

1. Field of the Invention

The present invention generally relates to thermal cutting machines such as laser beam cutting machines and plasma arc cutting machines for cutting sheet-like workpieces such as sheet metals and more particularly to a dust collecting apparatus for collecting dust in the nature of molten metals or slags produced in such cutting machines.

2. Description of the Prior Art

As is well-known, thermal cutting machines such as laser beam cutting machines, plasma cutting machines and flame cutting machines are used to cut sheet-like workpieces such as sheet metals in many industries. During cutting operations of such cutting machines, dust in the nature of molten metals or slags including fine or minute particles are produced from the workpieces to be cut together with hot fumes by laser beam, plasma arc or acetylene flame at the working area.

Heretofore, it has been customary that the molten metal is collected by a bucket disposed just beneath the working area, while the fumes are disposed of by a filter of a dry exhaust system, so that foreign particles can be filtered from the fumes in order to provide a relatively clean discharge to the atmosphere. As the fumes, however, are passed through the filter, fine or minute particles such as chromium oxide, which is formed in the cutting of materials such as stainless steel, cannot be eliminated from the fumes and also the temperature of the fumes discharged into the atmosphere will remain high. Accordingly, it has been conventionally disadvantageous that the fine or minute particles of the molten metals and the heat of the fumes produced during cutting operations will pollute or contaminate the work environments of the thermal cutting machines. Furthermore, the bucket for collecting the molten metals or slags will be worn out early or will be shortened in its life by oxidization caused by high temperature of the molten metals, and otherwise it will be thermally deformed by the heat of the molten metals.

SUMMARY OF THE INVENTION

It is an object of the present invention to provide a novel thermal cutting machine such as a laser beam cutting machine or a plasma arc cutting machine having an improved dust collecting apparatus which is capable of eliminating fine or minute particles from fumes and collecting the fumes during cutting operations.

It is therefore another object of the present invention to provide a thermal cutting machine such as a laser cutting machine or plasma arc cutting machine in which the dust of the molten metals and the heat of the fumes produced during cutting operations are prevented from polluting or contaminating the work environments.

It is another object of the present invention to provide a thermal cutting machine such as a laser beam cutting machine or a plasma arc cutting machine having a venturi aspirator which is capable of efficiently sucking off the hot fumes together with the molten metals or slags.

It is a further object of the present invention to provide a thermal cutting machine such as a laser beam cutting machine or a plasma arc cutting machine, which is provided with materials fire-resistant against the molten metals or slags.

According to the present invention, in order to achieve the above mentioned objects, a thermal cutting machine such as a laser beam cutting machine or a plasma arc cutting machine comprises a dust collecting apparatus comprising a first dust collecting means beneath the working area and a second dust collecting means communicating with the first dust collecting means so as to eliminate and collect the molten metals or slags from the fumes. The first dust collecting means is provided with a ventri aspirator for sucking off hot fumes together with molten metals or slags from the working area, and it is provided with fire-resistant materials such as fire bricks. Also, in order to separate the fine particles from the fumes efficiently, the second dust collecting means is provided with a liquid filter having a bubble breaker to divide bubbles of the filtering liquid into smaller ones.

Other and further objects and advantages of the present invention will be apparent from the following description and accompanying drawings by way of illustration, which show a preferred embodiment of the present invention and the principles thereof.

DESCRIPTION OF THE PREFERRED EMBODIMENTS

Figure 1:
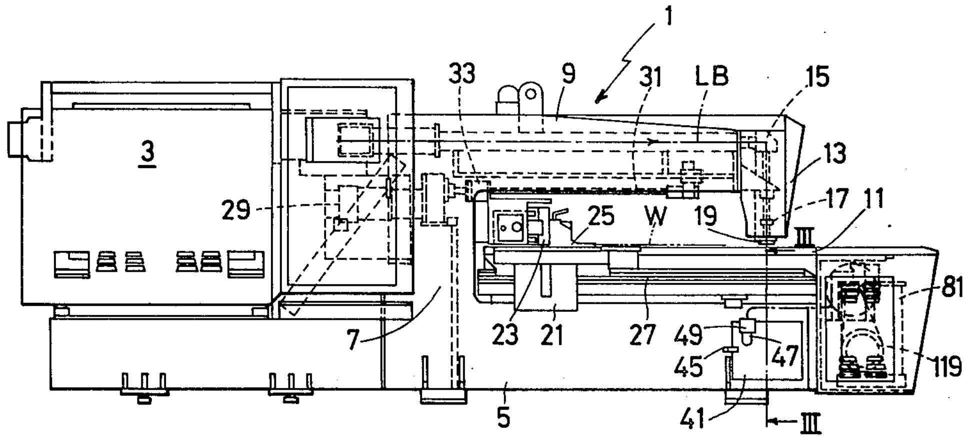
FIG. 1 is a side elevational view of a laser beam cutting apparatus embodying the principles of the present invention.

Referring now to FIG. 1, there is shown a laser beam cutting apparatus 1 which is generally designated by the numeral 1 and is connected with a laser resonator 3 such as a CO2 laser resonator. The laser resonator 3, which may be a commercially available one, is so arranged as to generate laser beam LB and direct it to the laser beam cutting apparatus. Laser resonator 3 is directly integrally connected to the rear of the laser beam cutting apparatus 1 in the preferred embodiment.

In this connection, however, it is to be noted that the present invention is not limited in application to the laser beam cutting machine 1 shown in FIG. 1 but is applicable to any other machines. It will be seen that the present invention is likewise applicable to plasma arc cutting machines and flame cutting machines, for instance, although the present invention will be described hereinafter as embodied in the laser beam cutting machine 1.

The laser beam cutting apparatus 1 comprises a base 5, a post 7 vertically formed or fixed to the base 5 and an overhead beam 9 horizontally supported over the base 5 by the post 7 in a cantilever manner. The base 5 is provided at its top with a work-table 11 on which a workpiece W such as a sheet metal is horizontally placed to be cut. The overhead beam 9 is provided at its forward end with a cutting head assembly 13 which includes a mirror assembly 15, focussing lens 17 and a nozzle 19. The mirror assembly 15 is arranged to reflect the laser beam LB delivered from the laser resonator 3 toward the workpiece W through the focussing lens 17 and the nozzle 19 is disposed to apply the laser beam LB to the workpiece W together with an assisting gas such as oxygen gas. Thus, the laser beam cutting apparatus 1 of the above construction is so arranged as to receive the laser beam LB from the laser resonator 3 and apply the laser beam LB to the workpiece W through the focussing lens 17 and the nozzle 19 as shown by the arrow to cut the workpiece.

In order to feed and position the workpiece W to be cut, the laser beam cutting apparatus 1 is provided with a first carriage 21 horizontally movable and a second carriage 23 which holds a plurality of work clamping means 25 and is slidably mounted on the first carriage 21. The first carriage 21 is slidably mounted on a pair of rails 27 which are fixed on the upper portion of the base 5 in parallel with each other so that it may be moved toward and away from the cutting zone just beneath the cutting head assembly 13. More particularly, the first carriage 21 is so arranged as to be horizontally moved along the top of the work-table 11 by servomotor 29 which drives a lead screw 31 and a nut 33 in the preferred embodiment for moving the second carriage 23 and the work clamping means 25 toward and away from the cutting zone. Also, the second carriage 23 holding the work clamping means 25 is mounted on the first carriage 21 so that it may be horizontally moved by servo motors (not shown) at right angles with the rails 27. Thus, the workpiece W which is gripped by the work clamping means 25 can be fed on the work-table 11 into a position beneath the cutting head assembly 13 by moving the first and second carriages 21 and 23. Also, it will be readily understood by those skilled in the art that the first and second carriages 21 and 23 can be automatically and continuously moved under a numerical control which is preprogrammed.

In the above described arrangement, the workpiece W can be cut by the laser beam LB when it is positioned just beneath the cutting head assembly 13 on the work-table 11 by the first and second carriages 21 and 23. Of course, the laser beam LB, which is produced by the laser resonator 3, is delivered into the cutting head assembly 13 and directed downwardly by the mirror assembly 15 as shown by the arrow and then applied to the workpiece W through the focussing lens 17 and the nozzle 19 together with an assist gas such as oxygen gas. Also, since the workpiece W is melted by the laser beam LB to be cut or pierced, dust of molten metals or slags including fine or minute particles will be produced together with hot fumes at the working area beneath the cutting head assembly 13, when the workpiece W is being cut.

Figure 2:
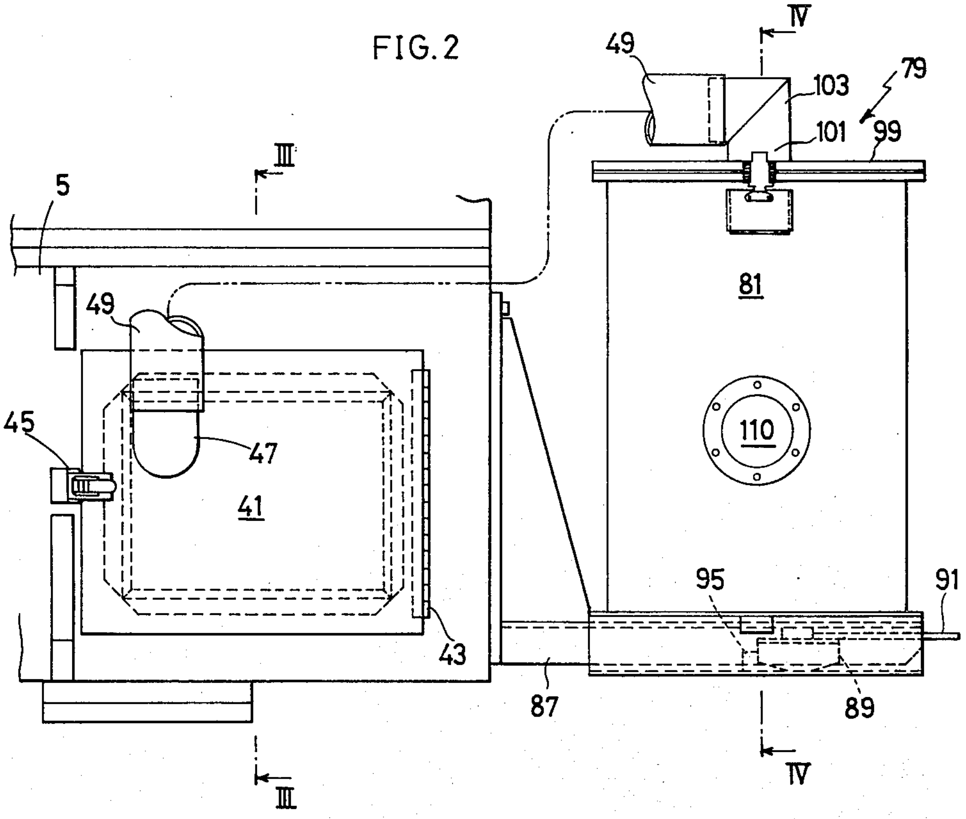
FIG. 2 is a partial view showing the front side portion of the laser beam cutting machine shown in FIG. 1 (the right-hand portion thereof) with a portion broken away for clarity.
Figure 3:
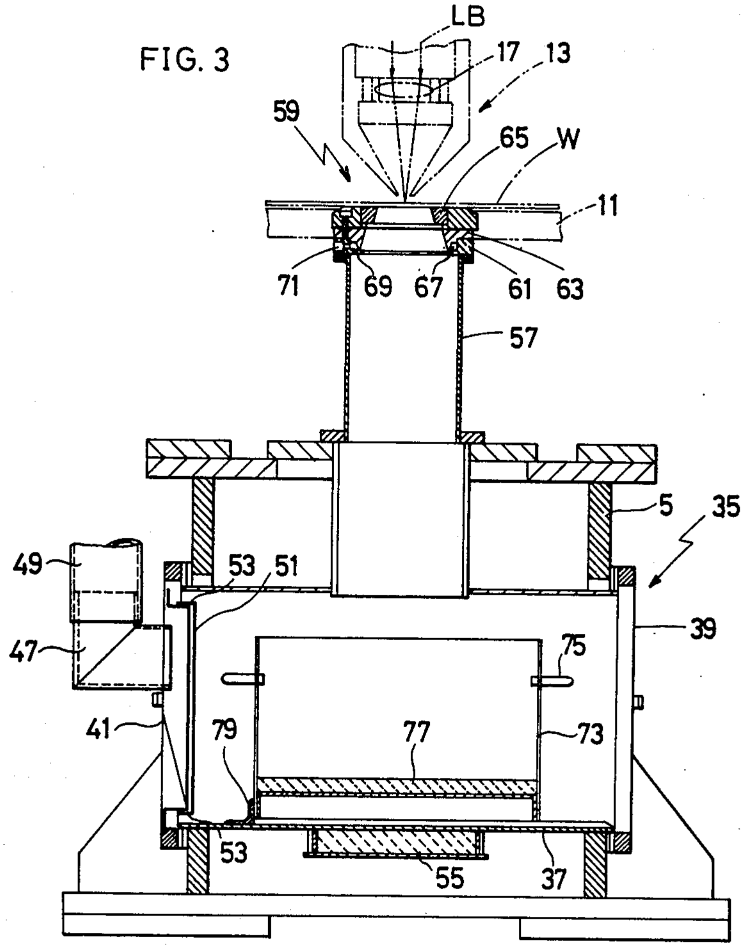
FIG. 3 is a sectional view taken along the line III—III of FIG. 2 and also FIG. 1 with portions omitted for clarity.

Referring to FIGS. 2 and 3, a first dust collecting unit 35 is provided in the base 5 just beneath the cutting head assembly 13 so as to collect the dust from of the molten metals or slags and pass the fumes to the atmosphere. The first dust collecting unit 35 is of a box-like frame having a base plate 37 and a pair of first and second doors 39 and 41 at its sides so that it can receive the molten metals or slags including fine particles together with the fumes from the working area. The first and second doors 39 and 41 are similar to each other in that each of them is pivotally connected to the first dust collcting unit 35 by a hinge 43 and has a locking means 45. However, the second door 41 is provided with an outlet pipe 47 which is outwardly projecting and connected to a flexible hose 49, and it is further provided at its inner side with a sheet-like air filtering means 51 as shown in FIG. 3. The air filtering means 51 is vertically supported by a pair of brackets 53 on the second door 41 at a space therefrom so that the fumes containing the fine particles can be sent therethrough to the outlet pipe 47. Also, the base plate 37 is provided at its top surface with a fire-resistant member 55 such as a firebrick so that it may be resistant to the laser beam LB which may come from the cutting head assembly 13 in an emergency as will be seen hereinafter.

As shown in FIG. 3, a conduit pipe 57 is vertically disposed in the base 5 just beneath the working area and the lower end of the conduit pipe 57 is communicated with the first dust collecting unit 35 so that the molten metals and the fumes can be dropped and sent thereinto. The conduit pipe 57 is provided at its top with an aspirator 59 which includes a first ring member 61 and a second ring member 63 placed on the first ring member 61 and having a workpiece support member 65 on its top. The workpiece support member 65 is disposed in horizontal alignment with the upper face of the work-table 11 to horizontally support the workpiece W. The first and second ring members 61 and 63 are so designed that an annular air chamber 67 having an annular slit 69 is formed therebetween in such a manner that the annular slit 69 is downwardly open. The annular air chamber 67 is communicated with an air source (not shown) by an air port 71 which is formed in the first ring member 61 in the preferred embodiment.

Thus, the fumes or gases produced by the laser beam LB in the region of the workpiece support member 65 will be drawn downwardly into the conduit pipe 59 by aspirating action together with the molten metals including the fine particles and then sent into the first dust collecting unit 35, where the air is blown out from the air port 71 through the annular air chamber 67 and the annular slit 69.

As is also shown in FIG. 3, a bucket 73 having handles 75 is provided in the first dust collecting unit 35 just beneath the conduit pipe 57 so as to collect the molten metals or slags. The bucket 73 is provided at its inner bottom with fire-resistant members 77 such as firebricks so that it may be resistant to the laser beam LB which will come from the cutting head assembly 13 through the conduit pipe 57 during cutting operations. Also, a stopper member 79 is fixed on the base plate 37 of the first dust collecting unit 35 so that the bucket 73 can be positioned beneath the working area in contact therewith. Thus, the molten metals or slags are effectively collected into the bucket 73 from the conduit pipe 57 and the bucket 73 can be pulled outwardly through the first door 39 by handles 75 to take out the molten metals or slags.

In the above described arrangement, the molten metals or slags, the fine particles and the fumes, which are produced at the working area just beneath the cutting head assembly 13 will be sucked off and sent into the first dust collecting unit 35 through the aspirator 59 and the conduit pipe 57. Thus, the molten metals or slags will be dropped and collected into the bucket 73 in the first dust collecting unit 35 when carried thereinto together with the fumes. Also, the fine particles and the fumes carried into the first dust collecting unit 35 will be further carried into the flexible hose 49 through the air filtering means 51 and the outlet pipe 47 as will be seen hereinafter. Of course, larger fine particles will be collected by the air filtering means 51, and only smaller ones will be carried therethrough into the flexible hose 49 together with the fumes.

Figure 4:
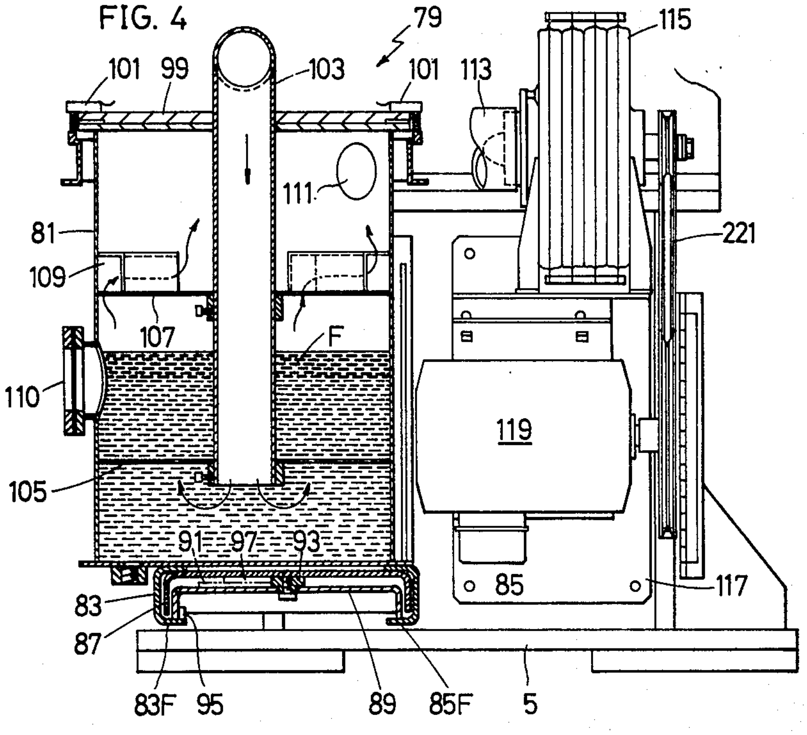
FIG. 4 is a sectional view taken along the line IV—IV of FIG. 2.
Figure 5:
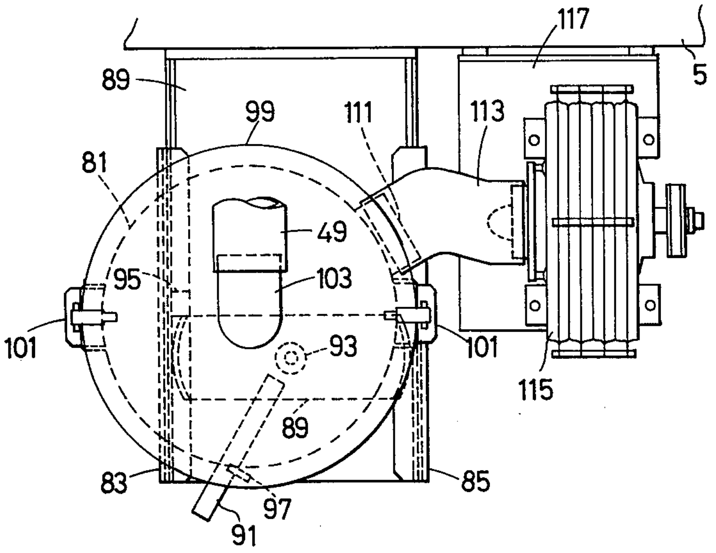
FIG. 5 is a plan view of showing the portion shown in FIG. 4 as viewed from the top.

Referring to FIGS. 2, 4 and 5, the first dust collecting unit 35 is connected by the flexible hose 49 to a second dust collecting unit 79 for dividing or eliminating the fine particles from the fumes and cooling the fumes. The second dust collecting unit 79 is constructed of a tank 81 which is drum-like in shape in the preferred embodiment, and it is disposed in the proximity of the first dust collecting unit 35 at the front end of the base 5.

In the preferred embodiment, the second dust collecting unit 79 is provided at its outer bottom with a pair of parallel elongated slide members 83 and 85 having flanges 83F and 85F, respectively, and it is supported by the slide members 83 and 85 on an elongated support member 87 which is C-shaped in cross section and is horizontally disposed at a portion of the base 5. More particularly, the flanges 83F and 85F of the slide members 83 and 85 are horizontally inwardly projected toward each other, and the second dust collecting unit 79 is slidably mounted on the support member 87 in such a manner that flanges 83F and 85F are extended beneath the support member 87. Also, in order to lock the second dust collecting unit 79 on the support member 87, a locking member having a lever member 91 is horizontally rotatably held by a pin 93 which is bolted to the underside of the support member 87, and stopper members 95 and 97 are fixed to the upper surface of the flange 83F and the underside of the support member 87. The locking member 89 is so arranged as to be rotated around the pin 93 by the lever member 91 above the flange 83F and 85F of the slide members 83 and 85 and be pushed thereto to lock the second dust collecting unit 79. Although, not shown, the stopper member 97 is formed with a shouldered portion on which the lever member 91 may ride in a flexed state in order to resiliently push the locking member 89 toward the flanges 83F and 85F of the slide members 83 and 85. Thus, the arrangement is such that the second dust collecting unit 79 is locked on the support member 87 when the locking member 89 is held downwardly pressed to the flanges 83F and 85F of the slide members 83 and 85 in contact with the stopper member 97 by the lever member 91 which rides on the shoulder portion of the stopper member 89. Of course, the second dust collecting unit 79 can be released from the locking member 89 when the lever member 91 is further flexed and rotated beneath the stopper member 97 out of contact therewith.

As shown in FIG. 4, the second dust collecting unit 79 is provided at its top portion with a cover member 99 and a plurality of locking means 101 for locking the cover member 99. Unit 79 is filled at its lower portion with filtering liquid F such as water as a filtration medium. Also, the second dust collecting unit 79 is provided with a duct 103 which is connected to the flexible hose 49 leading from the first dust collecting unit 35 and is vertically disposed through the cover member 99 in such a manner as to downwardly extend into the filtering liquid F and reach the proximity of the bottom thereof. Thus, the fumes containing the fine particles sent from the first dust collecting unit 35 through the flexible hose 49 are further sent into the filtering liquid F through the duct 103 and then will go up as bubbles through the filtering liquid F as will be seen hereinafter. It will be now understood that fumes sent into the second dust collecting unit 79 from the first dust collecting unit 35 will be filtered and cooled by the filtering liquid F and also the fine particles contained in the fumes will be separated from the fumes by the filtering liquid F.

As is also shown in FIG. 4, the second dust collecting unit 79 is further provided with a bubble breaking means 105 and a moisture separating means 107 having a plurality of vortical passages 109. The bubble breaking means 105 is of a disk-like plate member having a number of small holes, and it is horizontally disposed in the filtering liquid F at the lower inner portion of the second dust collecting unit 79 so as to break the bubbles of the fumes into smaller ones. More particularly, the bubble breaking means 105 is designed so that the bubbles of the fumes which have been sent into the filtering liquid F from the duct 103 can pass therethrough to go upward after being broken into smaller ones. Also, the moisture separating means 107 is of a disk-like plate and is horizontally disposed above the filtering liquid F, and the vortical passages 109 are provided on the top surface of the moisture separating means 107 in a manner such that that the fumes coming from the filtering liquid F can pass therethrough to go upwardly. The moisture separating means 107 is so arranged that the moisture contained in the fumes coming from the filtering liquid F will be condensed and separated from the fumes in the vortical passages 109 when the fumes are passing therethrough. Also, there is provided a viewing window 110 for the purpose of observing the status of the filtering liquid F. Thus, it will be now understood that the fumes brought into the second dust collecting unit 79 will be initially cooled by the filtering liquid F and then separated from the moisture of the filtering liquid F by the moisture separating means 107 and the fine particles will be separated from the fumes by the filtering liquid F.

As seen from FIGS. 4 and 5, in order to exhaust the fumes to the atmosphere, the second dust collecting unit 79 is provided with at its upper portion an exhaust outlet 111 which is connected by a flexible hose 113 to a vacuum pump 115. In the preferred embodiment, the vacuum pump 115 is mounted on a motor base 117 which is fixed to a portion of the base 5 so that it may be driven by a motor 119 mounted on the motor base 117 by means of a belt 221. In this arrangement, when the vacuum pump 115 is driven by the motor 119, the fumes in the second dust collecting unit 79 will be sucked into the vacuum pump 115 through the exhaust outlet 111 and the flexible hose 113 to be exhausted to the atmosphere. Also, it will be understood that the fumes will be continuously and positively sucked by the vacuum pump 115 so that they may be sent from the first dust collecting unit 35 to the second dust collecting unit 79 to go through the filtering liquid F therein, since the vacuum pump 115 will continuously work to decrease the pressure in the second dust collecting unit 35.

Figure 6:
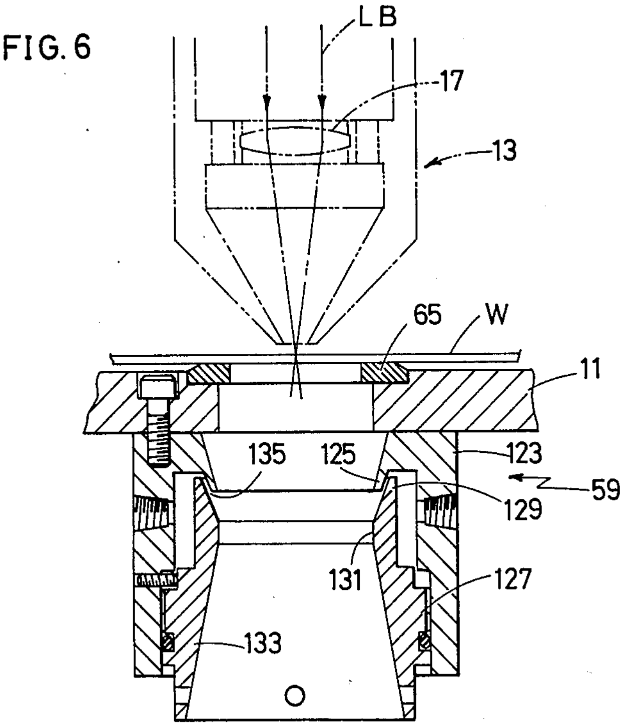
FIG. 6 is a sectional view of a second embodiment of a position of the laser beam cutting machine corresponding to the upper portion shown in FIG. 3.

Referring to FIG. 6, there is shown a second embodiment of the portion corresponding to the upper portion namely, the aspirator 59 of the first dust collecting unit 35 shown in FIG. 3. The second embodiment is more or less similar in construction and function to the first embodiment shown in FIG. 3, and therefore elements common to the first embodiment will be given the same reference numerals as the first embodiment and will be now described.

In the second embodiment, a second ring member 123 secured to the work-table 11 and corresponding to the second ring member 63 shown in FIG. 3 is formed with a funnel-like convergent portion 125 and is formed at its lower inner portion with a thread. On the other hand, a first ring member 127 corresponding to the first ring member 61 shown in FIG. 3 is provided with an upper convergent portion 129 similar to the convergent portion 125 of the second ring member 63. The first ring member 127 has a midway straight portion 131 smaller in diameter than a lower divergent portion 133. Also, the first ring member 127 is adjustably engaged with the second ring member 123 by means of the thread in such a manner as to form an annular slit 135 therebetween so as to form a venturi tube. In this arrangement, it will be understood that the annular slit 135 can be adjusted to provide the best condition in a venturi aspirating effect so as to suck the fumes together with the molten metals or slags and the fine particles into the first dust collecting unit 35.

Although a preferred form of the present invention has been illustrated and described, it should be understood that the device is capable of modification by one skilled in the art without departing from the principles of the invention. Accordingly, the scope of the invention is to be limited only by the claims appended hereto.

What is claimed is:

1. Apparatus for cutting a workpiece with heat energy such as laser radiation comprising:

a first filter chamber in which a bucket and an air filter are provided beneath a working area, a second filter chamber communicating with the first filter chamber, said second filter chamber being provided with a liquid filter and being communicated with a vacuum pump, and means for introducing fumes into the liquid filter from the first filter chamber through the air filter.

2. Apparatus according to claim 1 further comprising:

an aspirator positioned between the working area and the first filter chamber, said aspirator sucking the fumes into the first filter chamber.

3. Apparatus according to claim 2, wherein said aspirator includes a venturi tube.

4. Apparatus according to claim 1, wherein said first filter chamber provides an ancillary bed on the bottom thereof for slags.

5. Apparatus according to claim 1, wherein said second filter chamber provides a bubble breaker means for dividing large bubbles into small ones.

6. Apparatus according to claim 1, wherein said second filter chamber provides a moisture separator for depositing condensation from gases.

* * * * *